(12) United States Patent
Massand

(10) Patent No.: US 10,019,441 B2
(45) Date of Patent: Jul. 10, 2018

(54) SYSTEMS AND METHODS FOR MANAGING DOCUMENT REPOSITORIES

(71) Applicant: Litera Technologies, LLC, McLeansville, NC (US)

(72) Inventor: Deepak Massand, McLeansville, NC (US)

(73) Assignee: Litera Corporation, McLeansville, NC (US)

( * ) Notice: Subject to any disclaimer, the term of this patent is extended or adjusted under 35 U.S.C. 154(b) by 699 days.

(21) Appl. No.: 14/612,280

(22) Filed: Feb. 2, 2015

(65) Prior Publication Data

US 2016/0224548 A1 Aug. 4, 2016

(51) Int. Cl.
G06F 17/30 (2006.01)

(52) U.S. Cl.
CPC .. *G06F 17/30011* (2013.01); *G06F 17/30392* (2013.01); *G06F 17/30572* (2013.01)

(58) Field of Classification Search
CPC ......... G06F 17/30011; G06F 17/30392; G06F 17/30572
See application file for complete search history.

(56) References Cited

U.S. PATENT DOCUMENTS

| | | | | |
|---|---|---|---|---|
| 7,398,281 B2* | 7/2008 | Atchison | ........... | G06F 17/30011 707/608 |
| 7,810,027 B2* | 10/2010 | Bendik | ........... | G06F 17/248 715/200 |
| 9,229,934 B2* | 1/2016 | Mankala | ........... | G06F 17/30569 |
| 2002/0046224 A1* | 4/2002 | Bendik | ........... | G06F 17/248 715/200 |
| 2005/0216524 A1* | 9/2005 | Gomes | ........... | G06F 17/30578 |
| 2006/0195465 A1* | 8/2006 | Atchison | ........... | G06F 17/30011 |
| 2006/0195778 A1* | 8/2006 | Bendik | ........... | G06F 17/248 715/209 |
| 2009/0271872 A1* | 10/2009 | Ishizuka | ........... | G06F 17/30011 726/28 |
| 2013/0018904 A1* | 1/2013 | Mankala | ........... | G06F 17/30011 707/756 |
| 2013/0212151 A1* | 8/2013 | Herbach | ........... | H04L 67/42 709/203 |
| 2015/0220591 A1* | 8/2015 | Eberlein | ........... | G06F 17/30312 707/736 |
| 2015/0347447 A1* | 12/2015 | Ho | ........... | G06F 17/30174 707/622 |
| 2016/0132573 A1* | 5/2016 | Mankala | ........... | G06F 17/30011 707/756 |

* cited by examiner

*Primary Examiner* — Jean M Corrielus

(74) *Attorney, Agent, or Firm* — Finnegan, Henderson, Farabow, Garrett & Dunner LLP

(57) ABSTRACT

Disclosed systems and methods provide document management solutions for documents stored across multiple document repositories. In one embodiment, a method for managing document repositories is disclosed. The method may include accessing, by at least one processor, a first document repository and a second document repository, at least one the document repositories being located remotely to the at least one processor and accessed via a network. Operations of the method may also include receiving information associated with a plurality of documents managed by the first document repository and the second document repository, and publishing a user interface having graphical representations for the plurality of documents.

23 Claims, 8 Drawing Sheets

SYSTEMS AND METHODS FOR MANAGING DOCUMENT REPOSITORIES

FIELD

The disclosed embodiments generally relate to systems, methods, and articles of manufacture for managing document repositories. More specifically, the disclosed embodiments relate to unifying document management across multiple repositories.

BACKGROUND

With the proliferation of the use of electronic documents, high speed communication, and high capacity storage technology, users routinely employ multiple repositories for storing electronic documents. Such repositories may be local to the user or remotely located and accessed via a network such as the Internet. For example, repositories may include local storage, such as a structure on a local computer hard drive or the memory of a smartphone or tablet. Other repositories may include intranetwork (e.g., within a firewall) storage, such as a document management system or network-attached storage drive. Still other types of repositories enhance mobile access to electronics, e.g., cloud-based storage, which may include repositories such as SharePoint, MS OneDrive, Google Drive, iCloud, BOX, Dropbox, and Litéra Sync, among others.

Users may use multiple repositories for their own convenience and access while away or outside their internal firewall or network, or, they may save documents in cloud repositories so they can share with clients or partners (outside parties) without sending email attachments or giving them access to an intranet or extranet.

Variations between different repositories often lead to the storage of documents in multiple locations, creating difficulties for users to keep track of where particular documents are stored. Similarly, storage across multiple repositories creates challenges for controlling document versions and managing duplicates, as users may have difficulty keeping track of the storage location of particular versions or difficulty discerning whether a version stored in a particular repository is the same or different from a version stored in another repository or whether a version has been edited in one repository but not updated or synchronizes with the master copy in their document management system.

Even in instances when a user has different documents associated with a particular "matter or project" in several repositories, they need to go to multiple applications, sites, and/or screens to see all documents associated with the matter or project.

Organizations have obligations to control the storage and movement of documents and are faced with significant challenges understanding how their employees and agents are storing and sharing documents. Accordingly, there is a need for a systems and methods for managing documents across multiple repository platforms.

SUMMARY

The disclosed embodiments provide, among other things, methods and systems for managing documents from multiple document repositories and providing a single view, single interface where documents from all selected and authorized repositories are presented in a unified view.

Consistent with a disclosed embodiment, a system for managing document repositories is provided. The method may comprise a network, a memory storing instructions, and at least one processor in communication with the network and the memory. The at least one processor may be configured to execute the stored instructions to access a first networked document repository, the first networked document repository being remote to the at least one processor and accessed via the network, receive first information associated with a first document managed by the first networked document repository, generate a first entry in a database including the received first information, access a second document repository different from the first networked document repository, receive second information associated with a second document managed by the second document repository, generate a second entry in the database including the received second information, compare the first entry and the second entry, and generate a user interface including one or more graphical representations of the first entry and second entry, the one or more graphical representations indicating a storage location of the first document, a storage location of the second document, and whether at least one relationship exists between the first document and the second document based on the comparison of the first entry and the second entry.

Consistent with a disclosed embodiment, a method for managing document repositories is provided. The method may comprise accessing, by at least one processor, a first networked document repository, the first networked document repository being remote to the at least one processor and accessed via a network, receiving, by the at least one processor, first information associated with a first document managed by the first networked document repository, generating, by the at least one processor, a first entry in a database including the received first information, accessing, by the at least one processor, a second document repository different from the first networked document repository, receiving, by the at least one processor, second information associated with a second document managed by the second document repository, generating, by the at least one processor, a second entry in the database including the received second information, comparing, by the at least one processor, the first entry and the second entry, and generating, by the at least one processor, a user interface including one or more graphical representations of the first entry and second entry, the one or more graphical representations indicating a location of the first document, a storage location of the second document, and whether at least one relationship exists between the first document and the second document based on the comparison of the first entry and the second entry.

Consistent with another disclosed embodiment, a non-transitory computer readable medium is provided, storing instructions that when executed cause at least one processor to perform a method of managing document repositories. The method may comprise accessing a first networked document repository, the first networked document repository being remote to the at least one processor and accessed via a network, receiving information for a first plurality of documents managed by the first networked document repository, accessing a second document repository different from the first networked document repository, receiving information for a second plurality of documents managed by the second document repository, comparing the received information for the first plurality of documents and the second plurality of documents, determining a number of duplicate documents and a number of unique documents among the first plurality of documents and the second plurality of documents, generating, in a memory, at least one entry for the first plurality of documents and the second plurality of documents, the at least one entry including the number of duplicate documents or the number of unique documents, and generating a user interface including one or more graphical representations of the at least one entry, the one or more graphical representations indicating a storage location of at least one of the first plurality of documents, a storage location of at least one of the second plurality of documents, and the number of duplicate documents or the number of unique documents.

Consistent with another disclosed embodiment, another system for managing document repositories is provided. The system may comprise a network, a memory storing instructions, and at least one processor in communication with the network and the memory. The at least one processor may be configured to execute the stored instructions to access a first networked document repository, receive first information associated with a first document managed by the first networked document repository, generate a first entry in a database including the received first information, access a second document repository different from the first document repository, wherein at least one of the first document repository and the second document repository is remote to the at least one processor and accessed via the network, receive second information associated with a second document managed by the second document repository, generate a second entry in the database including the received second information, receive an instruction to sync the first document and the second document, modify the first entry and/or the second entry to indicate that the first document and the second document are synced, and generate a user interface including one or more graphical representations of the first entry and second entry, the one or more graphical representations indicating that the first document and the second document are synced.

Exemplary objects and advantages of the disclosed embodiments are set forth below, and in part will be obvious from the description, or may be learned by practice of the disclosed embodiments. Certain objects and advantages of the disclosed embodiments may be realized and attained by means of the elements and combinations particularly pointed out in the appended claims.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate embodiments of the disclosed embodiments and together with the description, serve to explain the principles of the disclosed embodiments.

BRIEF DESCRIPTION OF THE DRAWINGS

The accompanying drawings, which are incorporated in and constitute a part of this specification, illustrate various embodiments and aspects of the disclosed embodiments. In the drawings.

DESCRIPTION OF THE EMBODIMENTS

The disclosed embodiments provide document management systems and methods which may increase productivity and efficiency for users by linking physical and/or virtual document repositories that may otherwise be exclusive and utilize independent means of storing and managing documents. The disclosed embodiments link multiple document repositories and manage documents stored across linked repositories to provide an easy-to-use and robust management solution, which enhances the performance of computer systems associated with the document repositories by reducing unnecessary document copies thereby reducing storage and data transmission requirements, by linking related documents to facilitate streamlined updating and storage functions, and by efficiently utilizing physical and virtual computer resources during document viewing, retrieval, updating, and storage functions.

Reference will now be made in detail to exemplary disclosed embodiments, examples of which are illustrated in the accompanying drawings. Wherever possible, the same reference numbers will be used throughout the drawings to refer to the same or like parts.

Figure 1:
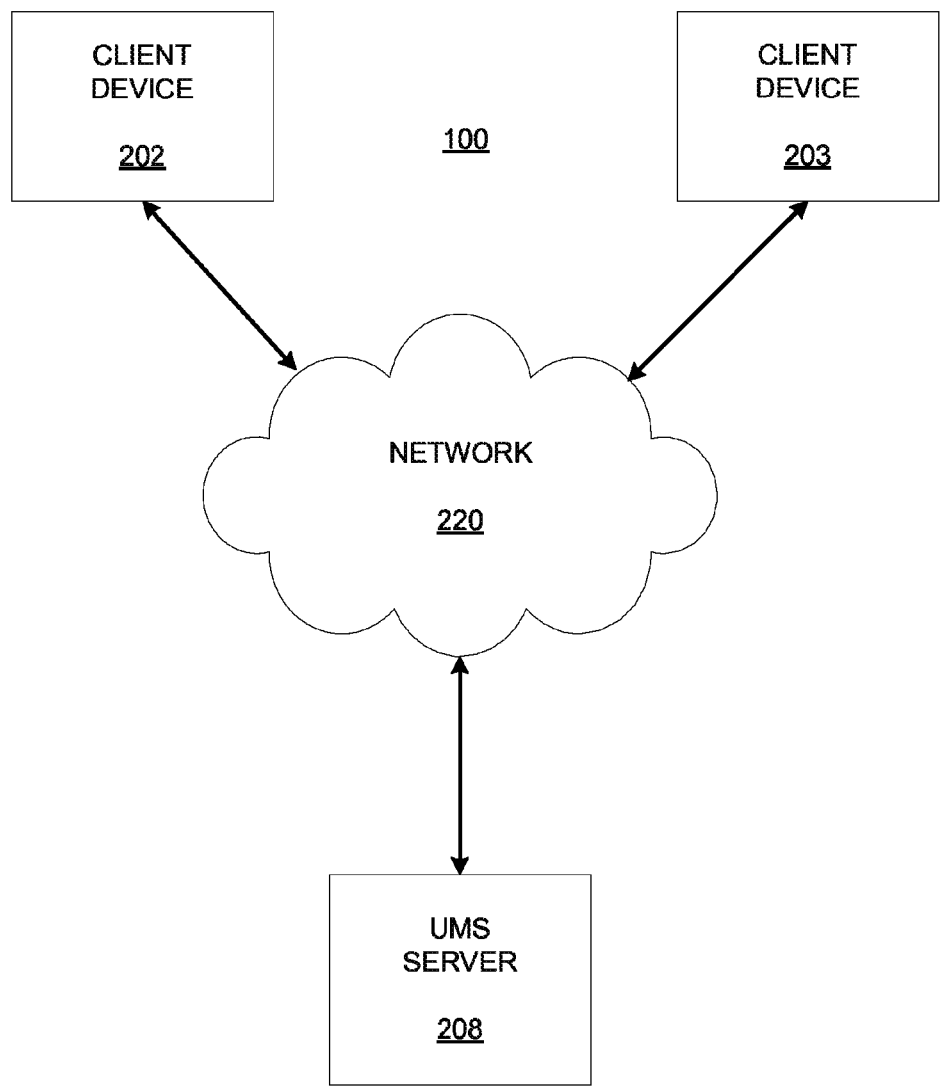
FIG. 1 illustrates an exemplary system environment consistent with disclosed embodiments.

FIG. 1 illustrates an exemplary system environment 100 consistent with certain disclosed embodiments. In one example, system 100 includes one or more client devices 202 and 203 that may be connected to a network 220 and may create, store, and/or share electronic documents with each other. For example, in one aspect, client devices 202 and 203 may be configured to generate, modify, store, transmit, receive, and display one or more types of documents. In some embodiments, client devices 202 and 203 may also establish bidirectional communication with one or more document repositories. System environment 100 may also include a Unified Management System (UMS) server 208, which may be configured to manage one or more documents created by users associated with each of client devices 202 and 203. For example, in one aspect, DMS server 208 may be configured to receive instructions from client devices 202 and 203, establish bi-directional communication with one or more document repositories, and generate instructions for causing client devices 202 and 203 to display one or more graphical user interfaces.

Client devices 202 and 203 may include computer systems having one or more computing components for performing one or more processes consistent with certain aspects of the disclosed embodiments. In one embodiment, client devices 202 and 203 may include one or more computer or data processing devices such as a PC, laptop computer, desktop computer, tablet, mobile phone, smart phone, or other mobile devices that have hardware (e.g., one or more processors, storage memory, data buses, network interface, etc.), software (e.g., web browsers, application programs, operating systems, add-ins for software programs or systems, other executable program code written in any known programming language such as PL/SQL, AJAX, XML, JavaScript™, C, C++, Java™, etc.), and/or firmware (e.g., software embedded in a hardware device).

Figure 2:
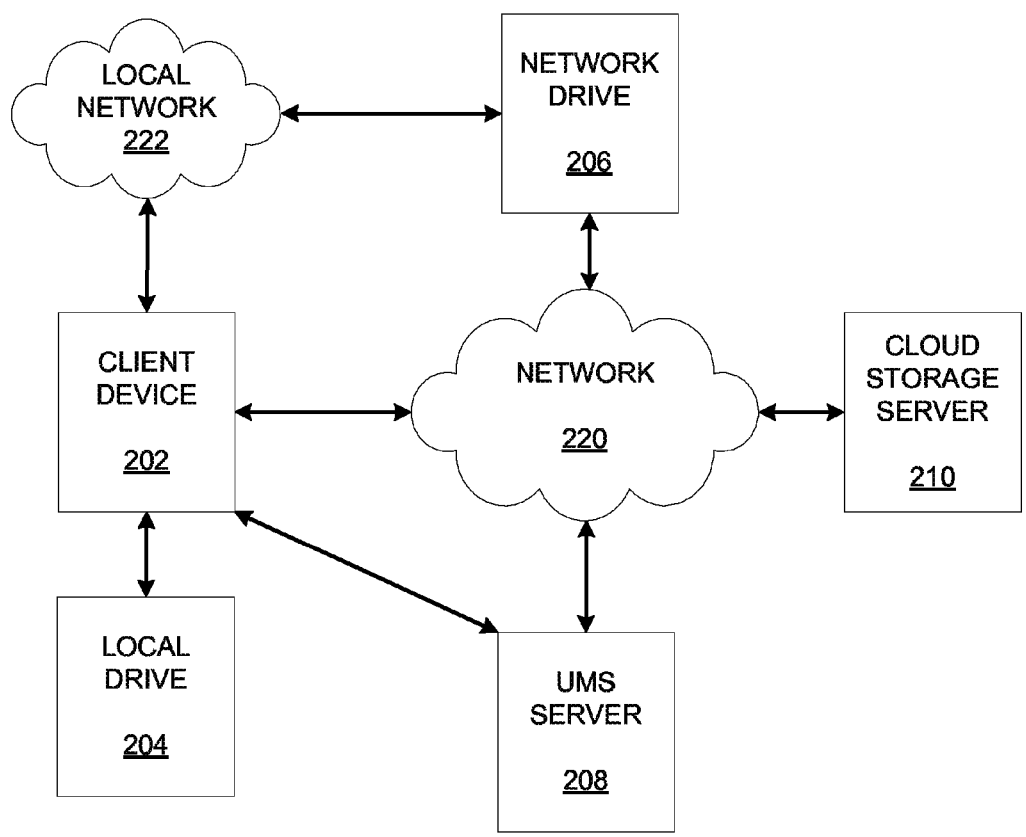
FIG. 2 illustrates an exemplary system for managing document repositories, consistent with disclosed embodiments.

Client devices 202 and 203 may be configured to communicate with one or more networks, such as network 220, and with other clients or servers connected to network 220, including other computers or components (not shown) connected to a local network 222 (as shown in FIG. 2). One or more users may operate one or more components of client devices 202 and 203 to perform one or more processes consistent with the disclosed embodiments. Also, client devices 202 and 203 may be associated with an entity, such as a company, organization, government agency, educational or medical facility, firm, or any other type of business or non-business entity. In certain embodiments, client device 202 may be associated with an entity that is different from that associated with client device 203. Alternatively, client devices 202 and 203 may be associated with the same entity. Further, client device 202 may be associated with a department, division, etc., of an entity that is different from a department, division, etc., of the same entity associated with client device 203.

Client devices 202 and 203 may execute software processes stored on tangible and/or non-transitory computer-readable mediums that perform one or more processes consistent with the disclosed embodiments. While FIG. 1 illustrates two client devices 202 and 203, aspects of the disclosed embodiments are not limited to such a configuration. Thus, the disclosed embodiments may be implemented with any number of clients interconnected by one or more networks, including but not limited to network 220. Further, the term "client device" used herein to describe client devices 202 and 203 is not intended to be limiting to a client in the sense of known client-server configurations, although such configurations may be implemented by the disclosed embodiments. For example, client devices 202 and 203, may be (or include) a server type computer system or server software that may also request and receive information, data, services, processes, etc., from another computer system in a local and/or remote network.

In one embodiment, client devices 202 and 203 may perform various operations on documents, including creating, saving, sharing, sending, storing, and the like. A document may be selected from any type of file, such as a spreadsheet, a text file, an image, a database, a temporary buffer, a web-page, an email, a worksheet, a .PDF, .DOC, .EXE, PPTX or .XLS file, images or audio and video files or any other type of file or structure used to store information. A document may also be a folder or sub-folder containing one or more files, or a combination of one or more files, including but not limited to bound files, merged files (e.g., PDFs), .ZIP and other types of files. In certain aspects, a document may also have certain access rights associated with it, e.g., read-only, edit-only, comment-only, etc. In still other aspects, an attachment may have security classifications associated with it, e.g., "confidential," "not available for sending," etc. The above-listed examples of documents are not intended to be limiting of the scope of the disclosed embodiments.

Network 220 may be any type of communication network configured to communicate information in system 100. Network 220 may be a wireless and/or wireline network including one or more components (e.g., hardware, software, and/or firmware) configured to receive, route, translate, and deliver information. For example, network 220 may be the Internet, an Extranet, an intranet, a Local Area Network, Wide Area Network, etc., and combinations of such exemplary networks, that enables clients (or other computer systems) to communicate and collaborate in accordance with aspects of the disclosed embodiments. Network 220 may include infrastructure that implements the communication of information over these types of networks, such as routers, bridges, servers, wireless/wireline base stations, transceivers, and related technology. In certain embodiments, network 220 may be separate networks that connect client device 202 to various document repositories. For example, network 220 may include a local area network, such as local network 222 (shown in FIG. 2), wide area network, portions of the Internet, etc., that provide connections between client device 202 and document repositories that is different (in whole or in part) than a local area network, wide area network, portions of the Internet, etc., that provides connections between device 203 and various document repositories.

FIG. 2 shows an example of a system 200 for managing document repositories, consistent with disclosed embodiments. System 200 may include client device 202, local drive 204, network drive 206, document management system (UMS) server 208, and cloud storage server 210. Components of system 200 can be located in a single geographical location or distributed among multiple geographical locations. Furthermore, components of system 200 may represent a collection of devices in a single geographical location or distributed among multiple geographical locations. For example, cloud storage server 210 may comprise multiple computer systems or servers located in a single or multiple geographical locations, but all associated with a single cloud storage service operating the cloud storage server 210.

Client device 202 may be one or more computer systems configured to execute software to create, edit, modify, manage, import, and export documents. For example, client device 202 may be a desktop PC, a laptop, a PDA, a workstation, tablet, cell phone device, smart phone device, or any other processor, computer, or device (or group thereof) configured to locally or remotely execute software, send and receive information over a network, such as the internet, and perform data processing operations. In one embodiment, client device 202 may include one or more computer or data processing devices that have hardware (e.g., one or more processors, storage memory, data buses, network interface, etc.), software (e.g., web browsers, application programs, operating systems, add-ins for software programs or systems, other executable program code written in any known programming language such as PL/SQL, AJAX, XML, JavaScript™, etc.), and/or firmware (e.g., software embedded in a hardware device).

One or more users may operate client 202 to perform functions consistent with certain disclosed embodiments. In certain embodiments, client device 202 may execute software that performs processes that access one or more local drive 204, and may also access network drive 206, UMS server 208, and/or cloud storage server 210. In one embodiment, client 102 may execute one or more client applications, which may be software applications that work with emails, attachments, documents, data, content or other types of information. For example, client 202 may execute one or more email applications such as Microsoft Outlook™, word processing applications, spreadsheet applications, document management system (UMS) application, and/or document collaboration applications such as Google Docs™ Zoho™, or a Litera IDS® client. Client device 202 may also include one or more applications that provide different types of features, such as email, document creation and editing, document sharing via email and other communication means, document transfer to virtual deal rooms, document comparison, document type conversion, PDF, printing, optical character recognition (OCR), extraction, redaction, webpage related applications, graphical drawing applications, financial service applications, etc., without departing from the features of the disclosed embodiments.

Local drive 204 may be one or more local memory storage media able to connect with client device 202. For example, local drive 204 may include one or more storage systems (including, e.g., a database server, or a computer configured as a target drive) and one or more tangible non-transitory storage media (such as one or more databases, flash drive, hard drives, or other types of storage devices) connected to client device 202 via a direct wired and/or wireless connection. Although FIG. 2 shows client device 202 and local drive 204 as separate components, the disclosed embodiments may implement single computer systems that operate as a client device 202 and local drive 204, or any combination thereof. For example, in some embodiments local drive 204 may be a folder or drive partition located in memory 340 of client device 202 (depicted in FIG. 3).

Network drive 206 may be one or more memory storage media in communication with client device 202 via a network connection, such as network 220. Whereas local drive 204 may be connected to client device 202 within a firewall, network drive 206 may be located "outside" a firewall for client device 202. In some embodiments, network drive 206 includes a storage system (e.g., a database server, a network-attached storage, or a computer configured as a target drive) connected to client device 202 via network 220. In some embodiments, network drive 206 may communicate with client device 202 via a network other than network 220 (not shown in the figures).

Cloud storage server 210 may include a physical and/or virtual storage system associated with a cloud storage service for storing documents and providing access to documents via a public network such as the Internet. Cloud storage services may include known or any then available cloud services such as, for example, Sharepoint, MS One Drive, Google Drive, Apple iCloud, Dropbox, Litéra Sync, Amazon Cloud Drive, box, Spideroak, or email archiving service providers such as Postini (Google), Yahoo, Mimecast or other type of cloud services accessible via network 220.

In some embodiments, cloud storage server 210 comprises multiple computer systems spanning multiple locations and having multiple databases or multiple geographic locations associated with a single or multiple cloud storage service(s). As used herein, cloud storage server 210 refers to physical and virtual infrastructure associated with a single cloud storage service. In some embodiments, cloud storage server 210 manages and/or stores one or more documents associated with a cloud service account for the user. Cloud storage server 210 may generate instructions for causing client device 202 to display a user interface for viewing and modifying documents managed and/or stored by cloud storage server 210, as well as uploading, downloading, and deleting documents. In some embodiments, cloud storage server 210 comprises a computer system for providing document management services such as, for example, SharePoint®, Desksite®, Autonomy iManage, OpenText Tempo™, WorldDox®, NetDocuments®, DropBox, Box.net, Litéra Sync or network storage.

In some embodiments, local drive 204, network drive 206, or cloud storage server 210 may be managed by one or more entities including an employee, such as an administrator, having control of the respective document repositories. The administrator may grant permission for others to access the document repository and modify, add, or delete documents. For example, a cloud storage server 210 may be associated with a corporate document management service having an administrator in charge of one or more user accounts. In some embodiments, the corporate document management service may utilize multiple synced document repositories such that a master document repository which does not allow any user intervention synchronizes copies of documents with other document repositories in the document management service. In such embodiments, the administrator may control which document repositories can be accessed, and who may access the document repositories.

UMS server 208 may include a computer system configured with specialized hardware and/or software modules for managing a plurality of documents across multiple document repositories. UMS server 208 may generate, or instruct client device 202 to generate, one or more graphical user interfaces for simultaneously managing original emails, attachments, and documents stored in one or more linked document repositories. Document management functions may include viewing, modifying, uploading, downloading, deleting, linking, and/or syncing one or more documents or all documents stored across the linked document repositories. These embodiments are intended to be exemplary only and not limiting of the inventions disclosed herein, as client device 202 may perform the functions illustrated herein as being performed by UMS server 208 in certain embodiments, and UMS server 208 may perform the functions illustrated herein as being performed by client device 202 in other embodiments. In some embodiments, for example, client device 202 may include specialized hardware and/or software modules for performing document management functions, and UMS server 208 may provide back-end support for linking document repositories and for directing traffic between client device 202 and the document repositories. In other embodiments, client device 202 may perform some or all off such document management functions, without the need for UMS server 208. In still other disclosed embodiments of the present methods, UMS server 208 may perform document management functions, while client device 202 serves as a portal to UMS server 208, and displays a graphical user interface in response to instructions received from UMS server 208.

Network 220 may include a wide area network or a local network, such as those previously described with respect to FIG. 1. Local network 222 may include a local area network or a direct wired/wireless connection, such as a portion of network 220 or a second network consistent with types of networks described with respect to network 220, for connecting one or more components of system 200. In some embodiments, local network 222 may comprise a LAN, WLAN, Ethernet, Bluetooth™ WiFi, USB, serial, or other wired/wireless connection between client device 202 and one or more of network drive 206, local drive 204, or UMS server 208.

Figure 3:
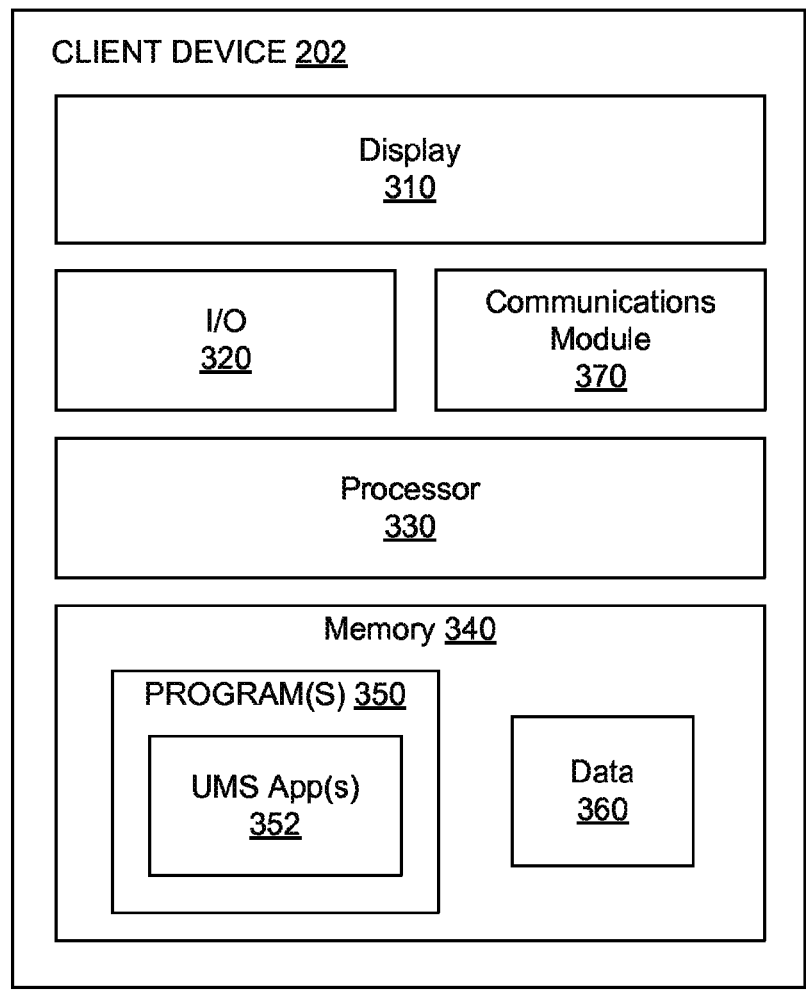
FIG. 3 is a block diagram of an exemplary client device, consistent with disclosed embodiments.

FIG. 3 is a block diagram of an exemplary client device 202, consistent with disclosed embodiments. As shown, client device 202 may include display 310, input/output (I/O) devices 320, processor 330, communications module 370, and memory 340 having stored thereon one or more programs 350 such as UMS application (app) 352 and storing data 360.

Display 310 may include one or more devices for displaying information, including but not limited to, liquid crystal displays (LCD), light emitting diode screens (LED), organic light emitting diode screens (OLED), and other known display devices.

I/O devices 320 may include one or more devices that allow mobile device 120 to send and receive information. I/O devices 320 may include, for example, a keyboard, buttons, switches, or a touchscreen panel. I/O devices 320 may also include one or more communication modules (not shown) for sending and receiving information via communications module 370 from other components in system 200 by, for example, establishing direct wired or wireless connections between client device 202 and network 220, between client device 202 and UMS server 208, or between client device 202 and local drive 204 (direct connections not illustrated in figures). Direct connections may include, for example, Bluetooth™, Bluetooth LE™, WiFi, near field communications (NFC), or other known communication methods which provide a medium for transmitting data between separate devices.

Processor 330 may be one or more known processing devices, such as a microprocessor from the Pentium™ family manufactured by Intel™ or the Turion™ family manufactured by AMD™. Processor 330 may constitute a single core or multiple core processors that executes parallel processes simultaneously. For example, processor 330 may be a single core processor configured with virtual processing technologies. In certain embodiments, processor 330 may use logical processors to simultaneously execute and control multiple processes. Processor 330 may implement virtual machine technologies, or other known technologies to provide the ability to execute, control, run, manipulate, store, etc., multiple software processes, applications, programs, etc. In another embodiment, processor 330 may include a multiple-core processor arrangement (e.g., dual, quad core, etc.) configured to provide parallel processing functionalities to allow UMS server 208 to execute multiple processes simultaneously. One of ordinary skill in the art would understand that other types of processor arrangements could be implemented that provide for the capabilities disclosed herein.

Memory 340 may be a volatile or non-volatile, magnetic, semiconductor, tape, optical, removable, non-removable, or other type of storage device, or tangible and/or non-transitory computer-readable medium that stores one or more program(s) 350 such as UMS app 352, and data 360. In some embodiments, memory 340 may be included in local drive 204, or comprise a storage device that includes local drive 204. In some embodiments, memory 340 may include a hard drive partition, such as a "c:" drive, for storing one or more of programs 350 or data 360. Data 360 may include, for example, any other information that identifies the document repository or grants access to the document repository, including access information such as a network address or web address, a username, a password, etc.

Program(s) 350 may include operating systems (not shown) that perform known operating system functions when executed by one or more processors. By way of example, the operating systems may include Microsoft Windows™, Unix™, Linux™ Android, Apple™ operating systems, Personal Digital Assistant (PDA) type operating systems, such as Microsoft CE™, or other types of operating systems. Accordingly, disclosed embodiments may operate and function with computer systems running any type of operating system. Client device 202 may also include communication software that, when executed by a processor, provides communications with network 220, such as Web browser software, tablet, or smart hand held device networking software, etc. Client device 202 may be a device that executes mobile applications for performing operations consistent with disclosed embodiments, such as a tablet or mobile device.

Program(s) 350 may also include UMS app(s) 352, which when executed causes client device 202 to perform processes related to managing documents from document repositories such as: requesting and receiving input from a user identifying at least one document repository to link to UMS app 352, requesting and receiving input of credential information for the identified at least one document repository, generating and sending one or more requests for access to servers associated with the identified document repositories, receiving access information from the document repositories, receiving information regarding documents stored or managed by the document repositories, and updating a user interface by publishing identifying information for the documents. In some embodiments, functions of the above-discussed UMS app 352 may be performed by one or more applications executing on UMS server 208, and UMS app 352 may provide a portal for viewing and controlling the UMS server 208 applications.

Figure 4:
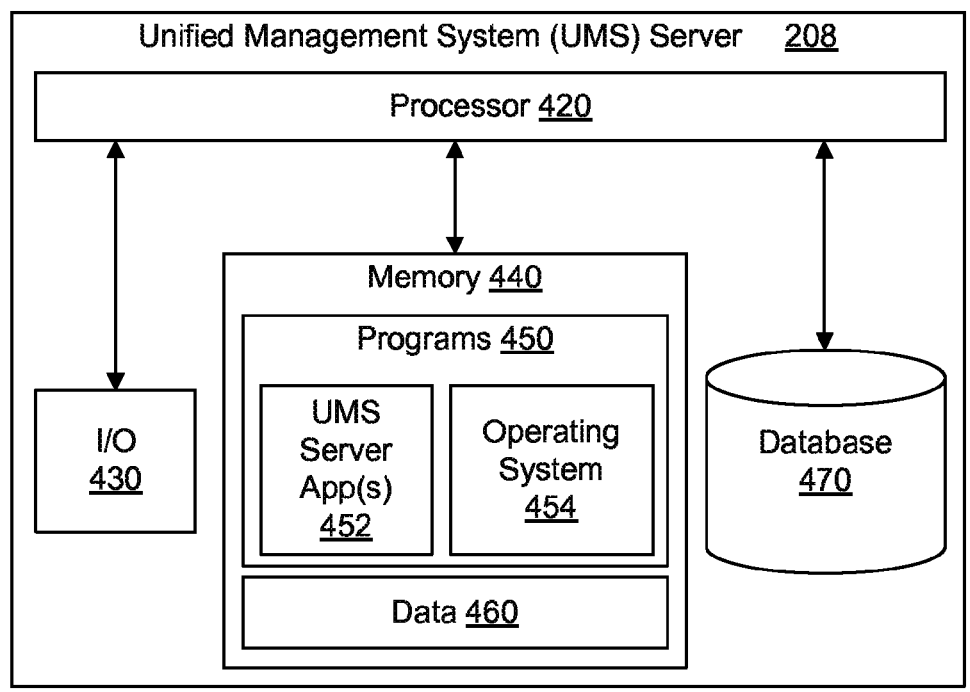
FIG. 4 is a block diagram of an exemplary document management system server, consistent with disclosed embodiments.

FIG. 4 is a block diagram of an exemplary UMS server 208, consistent with disclosed embodiments. As shown, UMS server 208 may include one or more processor 420, input/output ("I/O") devices 430, memory 440 storing programs 450 including, for example, server app(s) 452, operating system 454, and storing data 460, and a database 470. UMS server 208 may be a single server or may be configured as a distributed computer system including multiple servers or computers that interoperate to perform one or more of the processes and functionalities associated with the disclosed embodiments.

Processor(s) 420 may be one or more known computing devices, such as those described with respect to processor 330 in FIG. 3.

I/O devices 430 may comprise one or more interfaces for receiving signals or input from devices and providing signals or output to one or more devices that allow data to be received and/or transmitted by UMS server 208. For example, UMS server 208 may include interface components, which may provide interfaces to one or more input devices, such as one or more keyboards, mouse devices, and the like, that enable UMS server 208 to receive input from an administrator of UMS server 208 (not shown).

UMS server 208 may include one or more storage devices configured to store information used by processor 420 (or other components) to perform certain functions related to the disclosed embodiments. In one example, UMS server 208 may include memory 440 that includes instructions to enable processor 420 to perform, or to connect to one or more external systems capable of performing, functions related to document comparison, metadata modification and cleaning, document type conversion, optical character recognition (OCR), document transmission by communication means such as email, document sharing, and/or transfer a copy of the document to a virtual deal room or extranet, while retaining the ability to view the document and sync the transferred copy of the document. In some embodiments, UMS server 208 may execute one or more applications, such as server applications, a document management application, network communication processes, and any other type of application or software known to be available on computer systems. Alternatively or additionally, the instructions, application programs, etc., may be stored in an internal database 470 or external storage in direct communication with UMS server 208, such as one or more database or memory accessible over network 220. Database 470 or other external storage may be a volatile or non-volatile, magnetic, semiconductor, tape, optical, removable, non-removable, or other type of storage device or tangible and/or non-transitory computer-readable medium.

In one embodiment, UMS server 208 may include memory 440 that includes instructions that, when executed by processor 420, perform one or more processes consistent with the functionalities disclosed herein. Methods, systems, and articles of manufacture consistent with disclosed embodiments are not limited to separate programs or computers configured to perform dedicated tasks. For example, UMS server 208 may include memory 440 that may include one or more programs 450 to perform one or more functions of the disclosed embodiments. Moreover, processor 420 may execute one or more programs located remotely from system 200. For example, UMS server 208 may access one or more remote programs, that, when executed, perform functions related to disclosed embodiments.

Programs 450 stored in memory 440 and executed by processor(s) 420 may include one or more server UMS app(s) 452 and operating system 454. Server UMS app(s) 452 may include one or more document management applications that cause processor(s) 420 to execute one or more processes related to document management services provided to customers including, but not limited to, receiving one or more documents, cataloguing and causing the documents to be stored in one or more storage locations, tracking document versions and updates, providing access to stored documents, exporting documents, and deleting documents.

Memory 440 and database 470 may include one or more memory devices that store data and instructions used to perform one or more features of the disclosed embodiments. Memory 440 and database 470 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

UMS server 208 may also be communicatively connected to one or more remote memory devices (e.g., remote databases (not shown)) through network 220 or a different network. The remote memory devices may be configured to store information and may be accessed and/or managed by UMS server 208. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Figure 5:
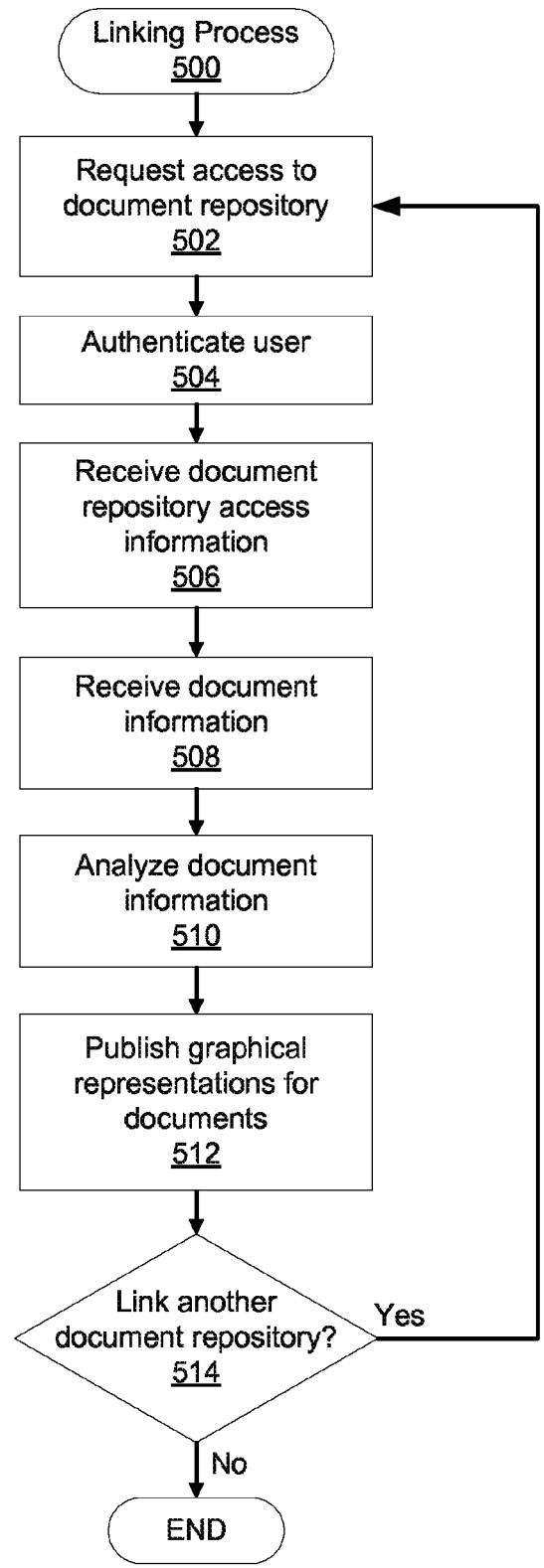
FIG. 5 is a flowchart illustrating an exemplary document repository linking process, consistent with disclosed embodiments.

FIG. 5 is a flowchart of an exemplary document repository linking process that may be performed by one or more components of system 200 consistent with certain disclosed embodiments. Depending on the type of application, each step of linking process 500 may be performed by client device 202, by UMS server 208, or in some embodiments by a combination of client device 202 and UMS server 208. While linking process 500 is discussed herein as performed by UMS server 208, in which client device 202 serves as a portal for viewing and controlling applications executing on UMS server 208 that accomplish the functions and steps of process 500, such an arrangement is not limiting of the embodiments disclosed herein. For example, in one embodiment, process 500 is performed by processor 420 of UMS server 208 configured to request access to a first document repository (step 502), authenticate a user associated with client device 202 (step 504), receive access information for the first document repository (step 506), receive document information for one or more documents managed by the first document repository (step 508), analyze the received document information (step 510), and publish graphical representations associated with the received document information (step 512). UMS server 208 may then determine if another repository is to be linked (step 514).

The steps of linking process 500 are described in further detail below. It will be apparent to those skilled in the art that, although the exemplary linking process of FIG. 5 is described as a series of steps, the order of the steps may vary in other implementations consistent with the present disclosure. In particular, non-dependent acts may be performed in any order, or in parallel.

In step 502, UMS server 208 requests access to a document repository. UMS server 208 may determine which document repository (e.g., local drive 204, network drive 206, or cloud storage server 210) to request access to, based on instructions received from client device 202. For example, client device 202 may receive instructions or input by a user operating client device 202, indicating which document repositories should be accessed and linked as part of linking process 500. In some embodiments, client device 202 may display a graphic user interface (GUI) with options for selecting one or more document repositories including, for example, local drive 204, network drive 206, and/or cloud storage server 210. Client device 202 may provide information related to the selected document repositories to UMS server 208, and UMS server 208 generates and transmits one or more requests to selected document repositories.

In some embodiments, UMS server 208 determines an application programming interface (API) associated with the selected document repositories, and executes one or more routines and protocols for the API, to establish a connection with the document repository software. For example, UMS server 208 may determine routines and protocols required for reading and writing documents managed by a cloud storage server 210 such as Google Drive™, and begin executing the routines and protocols.

In some embodiments, client device 202 generates and transmits requests to access document repositories. For example, in certain embodiments, UMS app 352 may request access to local drive 204, network drive 206, and/or cloud storage server 210, as well as various other types of document repositories.

In step 504, UMS server 208 authenticates the user to the document repository. In some embodiments, UMS server 208 provides one or more of a username, account number, password, PIN number, passphrase, biometric identifier, or any other information that the document repository requires to authenticate the user and grant access to the document repository. In some embodiments, UMS server 208 receives a request from the document repository for specific authentication information, and UMS server 208 solicits the required information from the user via client device 202 (not shown in figures). In some embodiments, UMS server 208 may store the user's authentication information for each linked document repository received during linking process 500. Thereafter, UMS server 208 may automatically log into each document repository when the user performs a single authentication with UMS server 208. In other embodiments, UMS server 208 does not store the user's authentication information, and instead requests and receives an authentication token from the document repository for future access, discussed in further detail below. If the document repository does not require authentication, such as a non-secure local drive 204 connected directly to client device 202, linking process 500 may omit step 504.

In some embodiments, access to a particular document repository may require authentication and/or permission by an administrator or entity other than the user. In such embodiments, UMS server 208 may identify the administrator and send a request to the administrator for permission to access the document repository. In some embodiments, the document repository may automatically contact the administrator, and UMS server 208 may pause or defer linking the document repository until the administrator grants permission and the document repository responds to the request. In such embodiments, UMS server 208 may generate and transmit a notification to the user via client device 202 if a predetermined period of time has elapsed since requesting access to the document repository.

In step 506, UMS server 208 receives access information for the requested document repository, such as an indication that access is granted to the document repository. In some embodiments, UMS server 208 receives a token from the document repository indicating that the document repository is linked with UMS server 208, and that a connection is established through the API for that document repository. Continuing the Google Drive™ example described above, UMS server 208 may receive a token from a server associated with Google Drive™, which UMS server 208 may use to communicate freely with the associated cloud storage server 210 using the Google Drive™ API, for viewing, reading, and writing documents managed by Google Drive™.

In some embodiments, step 506 includes receiving a simple response from the document repository. For example, when the requested document repository is a local drive 204 that does not require authentication, step 506 may include receiving a simple response to a ping from client device 202, confirming that local drive 204 is actively connected to client device 202.

In step 508, UMS server 208 receives information associated with documents managed and/or stored in the linked document repository. Associated information includes, in some embodiments, one or more of a document filename, document type, filename extension, indication of programs compatible with documents, document size, creation date, last modified date, upload date, document author, document contributor(s), document pathway in the document repository, document version number, and any other information that identifies the document, the location of the document (e.g., folders, subfolders, and any other storage identifiers), and any necessary attributes about the document. In some embodiments, document attributes may include an indication of document permissions related to functions available to different types of users and/or specific users. In some embodiments, document attributes may include audit logs indicating one or more of a document access history or a document location history, having the associated user/guest names, document repository locations, dates, and times that the document accessed and/or moved between various document repository locations.

In some embodiments, the document information includes a matter/project identification associated with the project. The matter/project identification may identify a folder name where the respective document is stored and/or managed by the document repository. In some embodiments, the matter/project identification may include a metadata tag or label having an alphanumeric identifier of a name or number of a project or matter associated with the document. In such embodiments, the matter/project identification may be used to locate and identify related documents having the same matter/project identification.

In embodiments that utilize UMS server 208 for some or all steps of process 500, client device 202 may receive document information from local drive 204, and forward the document information to UMS 208. However, in some situations, the user may choose to store sensitive data locally, to avoid unauthorized access over a network, and the user may wish to manage the locally-stored documents with documents stored over a network without distributing any information of the locally-stored documents. In some embodiments, client device 202 may retain document information received from local drive 204 without forwarding the document information to UMS server 208. In such embodiments, UMS app 352 may locally integrate document information received from local storage 204, without sending the local storage 204 document information to UMS server 208, to protect sensitive information in local storage 204 from being distributed over network 220.

In some embodiments, UMS server 208 may request and receive copies of documents stored in linked repositories, and stores received documents in a database, such as database 470. In other embodiments, UMS server 208 receives information associated with the documents sufficient to create a link (descriptive of the document name etc.) to display, but the content of the documents remains stored in the respective document repositories.

In some embodiments, UMS server 208 may request and receive notifications of changes to documents stored in linked repositories, and update documents stored in a database such as database 470. In other embodiments, UMS server 208 may receive a notification of changes to document content and/or document information associated with the documents sufficient to update a link (descriptor of document name etc.) to display, but the document content itself remains stored in the respective document repositories.

Figure 6:
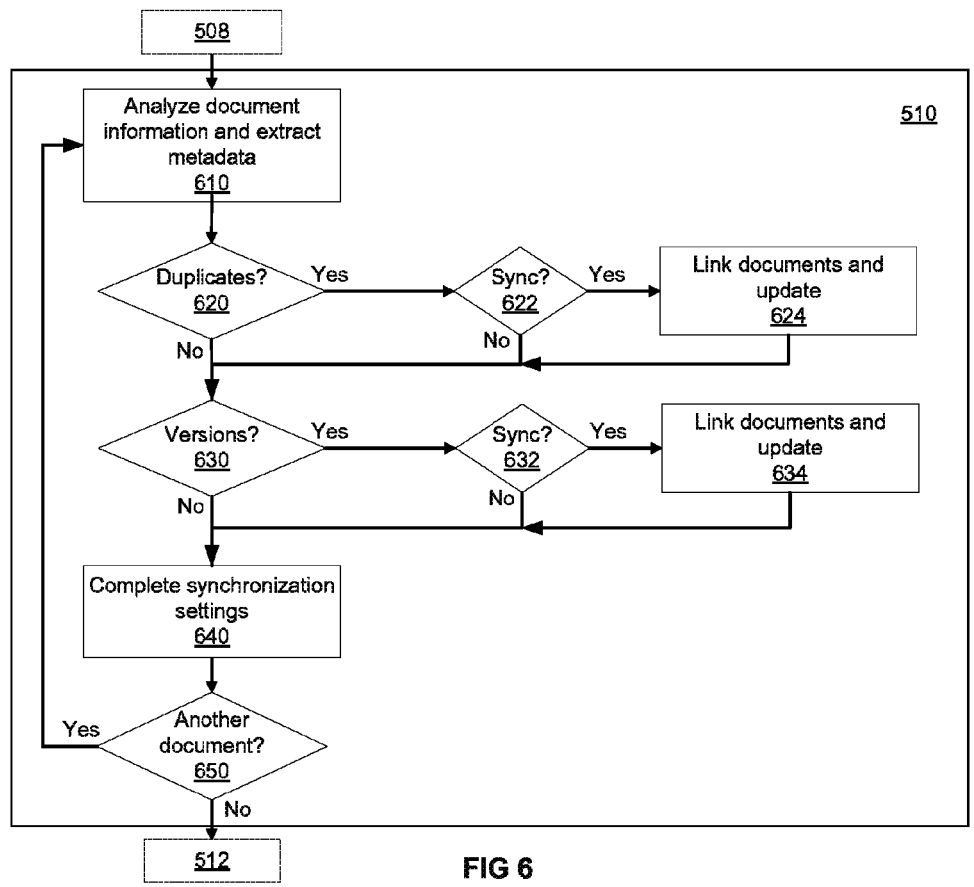
FIG. 6 is a flowchart illustrating an exemplary document analysis subroutine, consistent with disclosed embodiments.

In some embodiments, UMS server 208 may analyze and catalogue received document information, organize and control document versions, and determine duplicate documents stored in different document repositories, discussed in further detail with respect to FIG. 6.

In step 510, UMS server 208 may analyze received document information. In some embodiments, analysis may include indexing and cataloguing received document information, identifying one or more document versions and/or duplicates, and determining whether to synchronize one or more documents based on the received document information and predefined settings. In some embodiments, UMS server 208 may generate a data file and/or an entry in a database, such as database 470, corresponding to the analyzed document information. The generated data file can include at least one of the received document information, an address of a document, a link to the document, and information dynamically generated by UMS server 208 such as, for example, information regarding duplicates of the document, information regarding versions of the document, information regarding locations of the duplicates and versions in the linked document repositories, information regarding other documents linked to the document, information regarding synchronization settings between the document and one or more documents in linked document repositories, and any other information which UMS server 208 may generate reflecting relationships between the documents stored across linked document repositories. The generated data files and/or data entries may enable UMS server 208 to streamline synchronization processes, reduce the need for redundant searches for documents in linked document repositories, and create a dynamic data structure that links documents stored in separate document repositories that would otherwise remain separate and require individualized searching, management, and updating. Step 510 is discussed in further detail in the discussion of FIG. 6.

In step 512, UMS sever 208 may publish graphical representations associated with the received document information. Graphical representations may include, for example, textual labels, pictorial or textual icons, animated icons, or any other graphical object that identifies each of the documents managed by the linked document repository. In some embodiments, UMS server 208 may update a graphical user interface to display the graphical representations with graphical representations of documents from other linked document repositories. For example, UMS server 208 may display a single list of documents stored in local drive 204, network drive 206, and/or documents managed by cloud storage server 210.

In some embodiments the graphical representations, when selected, provide access to the associated documents stored and/or managed by the respective document repositories. In some embodiments, selecting a graphical representation may cause UMS server 208 and/or client device 202 to instruct a corresponding cloud storage server 210 to launch a document viewing application to display the selected document in a document. In other embodiments, selecting a graphical representation may cause UMS server 208 and/or client device 202 to retrieve the selected document from the document repository, and display the selected document in a browser generated by UMS app 352 and/or server UMS app 452.

In step 514, UMS server 208 may determine whether to link another document repository. This determination may include UMS server 208 sending an inquiry to the user via client device 202, asking whether to link additional document repositories. In some embodiments, UMS server 208 may automatically determine whether to link another document repository based on the initial instructions received at the beginning of linking process 500. For example, if the user identifies multiple document repositories to link at the beginning of linking process 500, UMS server 208 may sequentially link each of the identified document repositories without requesting additional instructions, until all of the identified document repositories are linked.

If UMS server 208 determines to link another document repository ("Yes" in step 514), linking process 500 may return to step 502, and UMS server 208 may generate a request to access the next identified document repository. If there are no additional document repositories to link ("No" in step 514), then linking process 500 ends.

FIG. 6 is a flowchart of a subroutine for analyzing document information (step 510 of FIG. 5). It will be apparent to those skilled in the art that, although the exemplary linking process of FIG. 6 is described as a series of acts, the order of the acts may vary in other implementations consistent with the present disclosure. In particular, non-dependent acts may be performed in any order, or in parallel. After receiving document information (step 508), UMS server 208 may begin step 510 by analyzing document information and extracting metadata (step 610). In some embodiments, UMS server 208 may receive the entire document including the document content, and UMS server 208 may index the character, words, numbers, and sentences of the document, in addition to extracting metadata from the document including, for example, a document type, creation date, last modified date, author, file size, and filename. In some embodiments, server 208 receives only document management information and/or metadata or a portion of such information and/or metadata, and UMS server 208 does not receive the content of the document. In such embodiments, in step 610 server may extract and identify the document name and other metadata of the document, including the metadata types listed above.

In step 620, UMS server 208 may check for duplicates of the document. Duplicates may include another document with the exact same filename and at least one metadata match. For example, UMS server 208 may determine that a copy of a document currently being processed already exists in another repository, based on matching filenames, equivalent file sizes, matching checksum values, and/or matching creation or modification dates. In some embodiments, UMS server 208 may compare the indexed document content with the content of documents in other linked repositories, to identify duplicate documents with matching content.

If there are no duplicates of the document ("No" in step 620), then the subroutine proceeds to step 630. If at least one duplicate is found ("Yes" in step 620), then in step 622 UMS server 208 may determine whether to sync the duplicates across the multiple document repositories. In some embodiments, syncing includes linking the duplicates to reflect future changes and content in a most-recently updated duplicate. UMS server 208 may request, via a display on client device 202, user input upon identifying one or more duplicates, to determine whether the duplicate documents should be linked. In some embodiments, the user operating client device 202 may select to link duplicate documents in preferences settings configured when adding a new document repository, discussed in further detail with respect to FIG. 7.

If the duplicates are to be synced ("Yes" in step 622), then in step 624 UMS server 208 may link the duplicates. In some embodiments, linking documents comprises generating and storing one or more scripts at UMS server 208 for identifying duplicates of a document, determining which duplicate was updated most recently, and overwriting the other duplicates with the content of the most-recently updated duplicate. UMS server 208 may run the script periodically, such as at a predetermined time interval or upon the occurrence of a trigger event. Because the duplicates already have identical content, syncing duplicates may include linking duplicate documents so that they will automatically update in the future when a duplicate is modified. After linking duplicates, the subroutine may proceed to step 630.

In step 630, UMS server 208 may check the linked document repositories for one or more versions of the document. In some embodiments, a version comprises a document having content that is substantially identical to the subject document content, with an amount of differences that is below a predetermined threshold. For example, a version may comprise 10 or fewer word differences from a subject document. In some embodiments, versions may include identical content as the subject document, but have one or more of a different filename, different author, or other different metadata.

If there are no versions of the document ("No" in step 630), then the subroutine proceeds to step 640. If UMS server 208 identifies more versions of the document ("Yes" in 630), then in step 632 UMS server 208 determines whether to sync the document versions.

If the versions are to be synced ("Yes" in step 632), then in step 634 UMS server 208 may link the document versions and updates document information for each of the versions.

In some embodiments, linking document versions may comprise generating metadata identifying the corresponding versions and their storage locations, and numbering the versions in order of their creation and/or modification dates. For example, UMS server 208 may identify three versions of a subject document stored in three different document repositories, where the three versions have the same document name but different variations of content. UMS server 208 may determine which of the three versions has the oldest creation and/or modification date, and label the oldest version "1.0," then identify the second-oldest version to label "2.0," and label the newest version "3.0."

After linking document versions, the subroutine may proceed to step 640 to complete synchronization settings. In some embodiments, the user may select one or more document repositories to link, to sync documents in each selected document repository, documents associated with a particular folder or matter, or specific documents. For example, the user may choose to sync documents stored in a folder for "matter A" in a source cloud storage CS1 to a destination cloud storage CS2. In step 640, UMS server 208 may determine whether a folder for matter A exists in CS2. If not, UMS server 208 may create a new folder for matter A in CS2, and copy documents associated with matter A to the new folder. UMS server 208 may also linked the copied documents, to update automatically when a document is updated in either CS1 or CS2. If a folder for matter A already exists in CS2, UMS server 208 may copy, from CS1, documents and/or versions for matter A which are not already present in CS2. In some embodiments, UMS server 208 may sync the document repositories in the opposite direction. For example UMS server 208 may copy, from CS2 to CS1, documents and versions for matter A which do not already exist in CS1. In some embodiments, UMS sever 208 may sync the document repositories bidirectionally, by copying documents and versions from CS1 to CS2, and documents and versions from CS2 to CS1, so that both document repositories have the same documents and versions. After completing step 640, UMS server 208 may delete documents stored in the destination document repository, depending on user settings and preferences.

In some embodiments, UMS server 208 may sync multiple document repositories in step 640. For example, UMS server 208 may sync documents from CS1 to CS2 and one or more of another cloud storage server 210, local drive 204, and network drive 206, depending on the user's preferences and settings.

In some embodiments, UMS server 208 may generate a data file and/or an entry in a database, such as database 470, corresponding to the analyzed document information (step not shown). The generated data file can include information dynamically generated by UMS server 208 during step 510 as well as other steps of linking process 500 such as, for example, information regarding duplicates of the document, information regarding versions of the document, information regarding locations of the duplicates and versions in the linked document repositories, information regarding other documents linked to the document, information regarding synchronization settings between the document and one or more documents in linked document repositories, and any other information which UMS server 208 may generate reflecting relationships between the documents stored across linked document repositories. In some embodiments, the data file may include information regarding a comparison of the document information, metadata, or content of multiple documents stored in different document repositories.

In step 650, UMS server 208 determines whether another there is another document for analyzing. If there is another document ("Yes" in step 650), then subroutine 510 returns to step 610. If all documents have been analyzed ("No" in step 650), then subroutine 510 ends, and process 500 proceeds to step 512.

Figure 7:
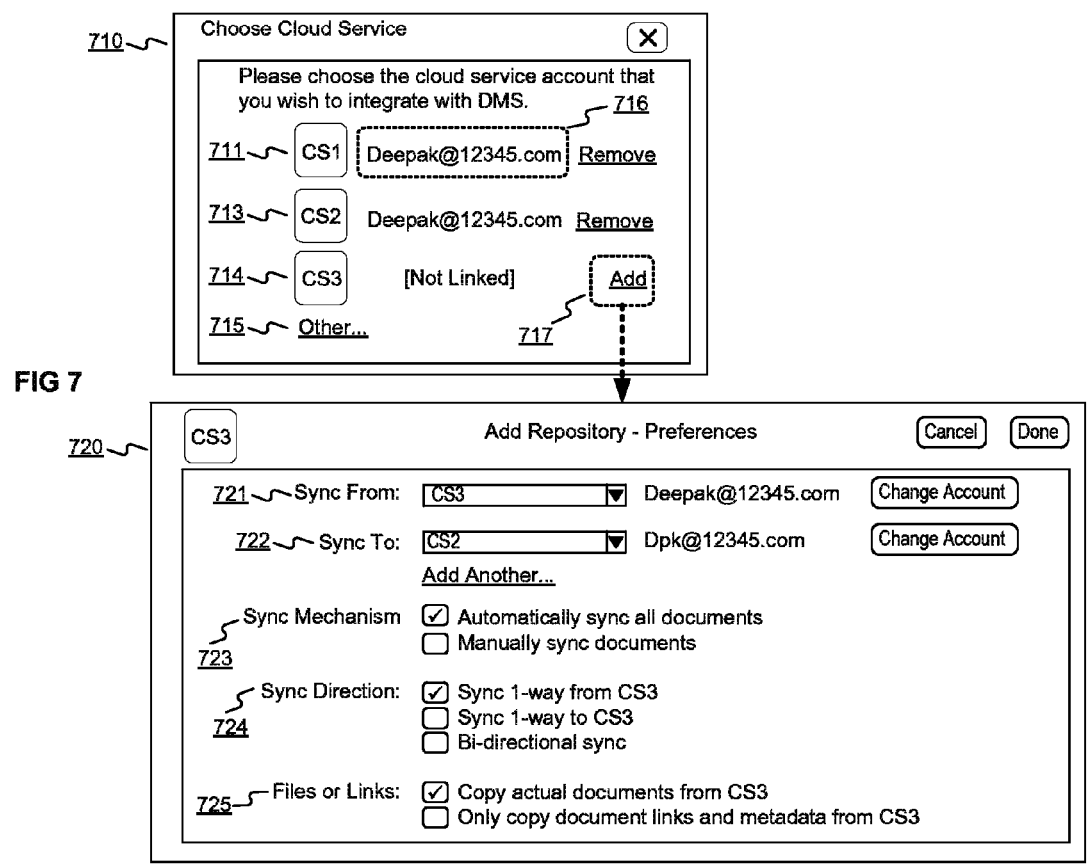
FIG. 7 is a diagram illustrating exemplary interfaces reflecting certain aspects of the disclosed embodiments.

FIG. 7 shows illustrations of exemplary document manage user interfaces, consistent with disclosed embodiments. As shown, the user interfaces may include a "choose cloud service screen" 710 and an "add repository preferences screen" 720. UMS server 208 may generate a user interface including screen 710 upon receiving an instruction from client device 202 to add a document repository. Screen 710 may include options for selecting one or more predetermined document repositories including, for example, Cloud Storage 1 (CS1) 711, Cloud Storage 2 (CS2) 713, or Cloud Storage 3 (CS3) 714. CS1, CS2, and CS3 may include one or more known cloud storage services such as, for example, SharePoint, MS One Drive, Google Drive, Apple iCloud, Amazon Cloud Drive, BOX, Dropbox, or Litéra Sync. Predetermined document repositories displayed in screen 710 may be preset by UMS server 208 and/or set by a user operating client device 202. An option to link another document repository 715 may also appear in screen 710, to allow the user to manually link a document repository of their choosing, such as another cloud storage server 210, a local drive 204, or a network drive 206.

In some embodiments, screen 710 displays a list of document repositories already linked. As shown, screen 710 displays one or more account names next to icons for linked document repositories, such as account name 716 displayed next to the icon for CS1 711. Account name 716 may include an email address or username for the account managed by cloud storage server 210 associated with CS1. If a predetermined document repository is not yet linked, selection of add button 717 instructs UMS server 208 to begin linking another repository, such as CS3 as shown in FIG. 7.

After receiving a selection of add button 717, UMS server 208 may generate another user interface including add repository preferences screen 720. Screen 720 may include one or more settings for instructing UMS server 208 to sync the newly linked document repositories with one or more linked document repositories. Screen 720 may include a sync from setting 721, a sync to setting 722, a sync mechanism setting 723, a sync direction setting 724, and a files or links setting 725.

Sync from setting 721 may allow selection of a source document repository from which to sync one or more documents. Sync from setting 721 may be preset by UMS server 208 to the document repository being linked. For example, in screen 710, the add button 717 corresponding to CS3 715 was selected, and therefore sync from setting 721 may be preset to CS3, as shown in FIG. 7. Moreover, screen 720 may include an icon for CS3 in the upper corner of the screen. In some embodiments, sync from setting 721 may also allow selection of a particular folder or matter within the source document repository. In the "matter A" example previously discussed, sync from setting may allow the user to select only "CS3—matter A" as the source document repository, rather than the entirety of the CS3 account.

In some embodiments, sync from setting 721 may also display an account username next to the document repository selection, and a "change" button allowing the user to select a different account for the source document repository. For example, if the user has multiple accounts managed by the same cloud storage server 210, in this case multiple documents managed by CS3, the user may select one of the multiple accounts to serve as the source document repository using the "change" button. If the source document repository is local drive 204 or network drive 206, screen 720 would not display any account information.

Sync to setting 722 may allow selection of a destination document repository to which documents will be synced. Sync to setting 722 may be preset to another linked document repository arbitrarily selected by UMS server 208, and the user may manually select a different destination document repository. In some embodiments, sync to setting 722 may also allow selection of a particular folder or matter within the destination document repository.

In some embodiments, sync to setting 722 may also display an account username next to the document repository selection, and a "change" button allowing the user to select a different account for the destination document repository. For example, if the user has multiple accounts managed by the same cloud storage server 210, in this case multiple documents managed by CS2, the user may select one of the multiple accounts to serve as the destination document repository using the "change" button.

In some embodiments, screen 720 may include one or more controls for adding additional document repositories for document syncing, such as via an "Add Another" button or link. In such embodiments, UMS server 208 may simultaneously link documents from the source document repository to multiple destination document repositories, and vice versa.

Sync mechanism setting 723 may instruct UMS server 208 to sync documents between the source and destination document repositories automatically or manually. For example, selection of "automatically sync all documents" may cause UMS server 208 to update all documents between the source and document repositories at predetermined intervals and/or once one or more documents are updated or created. As another example, selection of "manually sync documents" may instruct UMS server 208 to sync documents only upon receiving one or more instructions from client device 202.

Sync direction setting 724 instructs UMS server 208 whether to sync documents in one direction from the source document repository to the destination document repository, in one direction from the destination document repository to the source document repository, or in both directions between the source and destination document repositories. For example, selection of "sync 1-way from C53" may instruct UMS server 208 to sync new and updated documents in the source document repository (CS3) to the selected destination document repositories. As another example, selection of "sync 1-way to C53" may instruct UMS server 209 to sync new and update documents from the one or more selected destination document repositories to the source document repository. As yet another example, selection of "bi-directional sync" may instruct UMS server 208 to sync new and updated documents from the source document repository to the one or more destination document repositories, and sync new and updated documents from the one or more destination document repositories to the source document repository.

Files or links setting 725 instructs UMS server 208 whether to copy the content of the documents upon linking the document repository, or to only copy document information including document titles and metadata. In some embodiments, the files or links setting 725 may be independent of the other preferences, such that UMS server 208 always copies entire documents from one document repository to another when syncing selected source and destination document repositories. In such embodiments, files or links setting 725 may concern only documents copied from the newly-linked document repository to UMS server 208.

In some embodiments, one or more settings in add repository settings screen 720 may cause UMS server 208 to monitor the linked repositories and periodically synchronize documents stored in the linked repositories. For example, UMS server 208 may monitor documents associated with "matter A" in two linked document repositories, and continuously or periodically monitor each linked document repository to determine whether any documents are added or deleted for matter A. UMS server 208 may update entire linked document repositories, selected matters across linked document repositories, or individual documents, document duplicates, or document versions in this manner.

Figure 8:
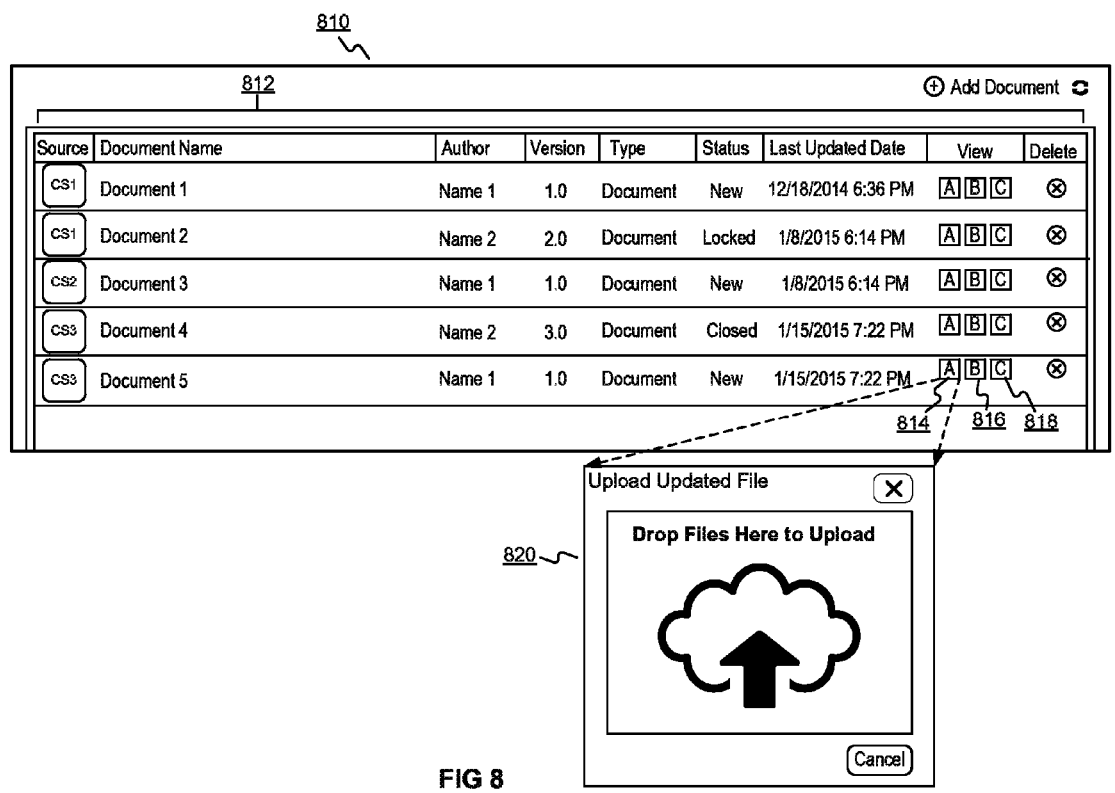
FIG. 8 is another diagram illustrating exemplary interfaces reflecting certain aspects of the disclosed embodiments.

FIG. 8 shows additional illustrations of exemplary document manage user interfaces, consistent with disclosed embodiments. A document management screen 810 provides a unified view of documents stored in and/or managed by multiple linked document repositories including, for example, one or more cloud storage servers 210 associated with Cloud Service 1 (CS1), Cloud Service 2 (CS2), and Cloud Service 3 (CS3). In some embodiments, linked document repositories also include one or more local drive 204 and/or network drive 206. Thus, document management screen 810 provides the ability to view and manage documents from multiple document repositories in a single, robust interface, whereas traditionally the individual document repositories are individually managed through exclusive and separate interfaces.

Document management screen may include document list 812, having document information displayed in the form of a list of graphical representations for documents in the linked document repositories. The displayed document information may include one or more metrics in the document information received from the document repository and/or metrics derived from the received document information. In some embodiments, information included in the graphical representations for each document may be organized into one or more of a source icon column, document name column, author column, version column, type column, status column, last updated date column, view column, and delete column.

The source icon column may include a pictorial representation, such as a picture or icon, of the source document repository for the document. As shown in FIG. 8, the source icon column includes icons for CS1, CS2, and CS3. In some embodiments, the source icon column may include icons for local drive 204, network drive 206, and other cloud services, depending on which document repositories are linked to UMS server 208.

The document name column may include a name or title of each document in the linked document repositories. In some embodiments, the document names listed in the document name column may serve as hyperlinks to the documents themselves. In some embodiments, selecting a hyperlink may instruct UMS server 208 to display and/or retrieve the selected document from its respective document repository. For example, if "Document 1" is selected, UMS server 208 may retrieve Document 1 and display the document within document management screen 810 or another screen generated by UMS server 208. In embodiments where UMS server 208 stores complete copies of the document content, UMS server 208 may retrieve the selected document from its own storage, such as database 470. In embodiments where UMS server 208 stores only document information and links to the document repositories, UMS server 208 may send one or more requests to a cloud storage server 210 associated with CS1, and retrieve the document content.

In some embodiments, UMS server 208 may receive instructions from the user via client device 202 to perform one or more operations on a document managed by a linked document repository. Using the hyperlinks in document list 812, the user may select a document, perform desired operations, and cause UMS server 208 to push the updated document and/or document information to the associated linked document repositories. In some embodiments, one or more selectable options can appear upon clicking a document hyperlink or "hovering" a mouse cursor over the document, for performing selectable functions. Functions can include, for example, selecting a document for comparison to another document; cleaning or removing or modifying document metadata; converting a document to another format, such as creating a PDF document from a word processor document; performing optical character recognition (OCR); sharing a document via electronic mail or other communication means; or transferring a document to a virtual deal room.

In other embodiments, selecting a hyperlink may instruct UMS server 208 to connect to the respective document repository, and to generate and display the selected document displayed in a user interface specific to the respective document repository. For example, if "Document 1" is selected, UMS server 208 may contact, via network 220, a cloud storage server 210 associated with CS1, and request the cloud storage server 210 to display Document 1 within its user interface.

The author column may include an identification of an individual who created or last updated the document including, for example, a name, abbreviation, initials, nickname, username, or other identifying set of characters.

The version column may include a number, letter, symbol, or word indicative of the document version. As previously discussed, document versions are documents having substantially similar content, with a predetermined maximum amount of variation between the content. In some embodiments, document versions are automatically detected by the document repository and/or UMS server 208. In some embodiments, document versions are manually identified by the document author when creating or modifying the documents. The version column may identify the version of the document in chronological order, such as by displaying higher numbers to newer document versions, and displaying lower numbers to older document versions.

In some embodiments, UMS server 208 may generate and cause a display of one or more alerts or notifications related to the documents displayed in document list 812. For example, upon "hovering" a mouse cursor over a particular document in document list 812, or over a particular matter/project identification (not shown in FIG. 8), UMS server 208 may generate and cause display of a pop-up window having information overlaid on document management screen 810. The overlaid information can include at least one of an indication or identification of other documents related to the particular document or matter/project, a location of the other related documents, an indication of duplicates or versions of the particular document, and/or one or more locations of the duplicates or versions.

In some embodiments, selecting a version number in the document version column, such as with a mouse cursor "click," "hovering" a mouse cursor over the version number, or via touchscreen input, may cause UMS server 208 to display additional information over document management screen 810, including the identification of other document versions, their creation/modification dates, and the document repositories in which the other versions are stored and/or managed.

The type column may include an identification of a type of document. As shown in FIG. 8, Documents 1-5 are of the same type: "Document." Depending on the document information for each document, the displayed "Type" may include various document types such as spreadsheets, presentations, images, and any other document types capable of storage in the linked document repositories.

The status column may include one or more indicators of a status associated with the document. The displayed indicators may be determined automatically by UMS server 208 and/or the document repository such as cloud storage server 210. In some embodiments, the displayed indicator(s) may be manually determined by the user or an author of the document. Types of statuses may vary depending on the needs of the user, the configuration of UMS server 208, and the configuration of the document repositories, and may include indications such as, for example, "new," "updated," "locked," "closed," "open," and any other status types preset by UMS server 208 or the document repository, or manually set by the user or document author.

The last updated date column may include a date and/or time that the document was most recently modified. In some embodiments, the "last updated date" may comprise the creation date of the document, if the document was never modified since its creation.

The view column may include one or more user-selectable icons which when selected perform one or more actions associated with a document or its corresponding document repository. As shown in FIG. 8, the view column may include, for example, option A 814, option B 816, and option C 818.

In some embodiments, selection of Option A 814 may instruct UMS server 208 to initiate a process of uploading an updated version of Document 5 to the UMS server 208 and/or the corresponding document repository, CS3. UMS server 208 may generate and cause client device 202 to display a user interface such as a pop-up window or overlaid window, such as an Upload updated file screen 820.

As shown in FIG. 8, upload updated file screen 820 may appear upon selecting, for example, option A 814, and may include one or more user interface elements for allowing a user to upload a new document version via client device 202. In some embodiments, upload updated file screen 820 may include a portion in which a user may "drag-and-drop" one or more documents for uploading to UMS server 208, without requiring the user to manually specify the pathway of the document's storage location.

Selection of option B 816 or option C 818 may instruct UMS server 208 to perform various functions such as, for example, manually refreshing the document synchronization with copies and/or versions in other document repositories, opening a preferences screen to change synchronization settings, displaying a list of corresponding copies or versions, displaying an address or pathway of the document's storage location, and displaying any other information or settings options associated with the document and/or its associated document repository, depending on the needs of the user, the configuration of UMS server 208, and the configuration of the document repository.

In some embodiments, the view column may provide additional or fewer options depending on the type of document, the document status, the capabilities of UMS server 208, and the configuration of the corresponding document repository. The delete column may include one or more selectable icons for deleting individual documents. In some embodiments, the delete column may include a selectable icon for deleting the document from UMS server 208 only, and an additional selectable icon for deleting the document from UMS server 208 and the document repository. In some embodiments, document list 812 may include more or fewer columns, depending on the needs of the user, the types of information included in the received document information, and the configuration of UMS server 208.

Other aspects of the disclosed embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

What is claimed is:

1. A system for managing document repositories, comprising:
   a network;
   a memory storing instructions; and
   at least one processor in communication with the network and the memory, the at least one processor configured to execute the stored instructions to:
   access a first networked document repository, the first networked document repository being remote to the at least one processor and accessed via the network;
   receive first information associated with a first document managed by the first networked document repository;
   generate a first entry in a database including the received first information;
   access a second document repository different from the first networked document repository;
   receive second information associated with a second document managed by the second document repository;
   generate a second entry in the database including the received second information;
   compare the first entry and the second entry, by:
      analyzing the first information included in the first entry and the second information included in the second entry, and
      determining, based on predefined criteria for at least one of duplicates or versions, whether the first document and the second document are related as duplicates or versions;
   responsive to a determination that the first document and the second document are related as duplicates, generating data for automatically updating the duplicates when a duplicate is modified, thereby linking the duplicates;
   responsive to a determination that the first document and the second document are related as versions, generating metadata identifying the versions and corresponding storage locations, thereby linking the versions; and
   generate a user interface including one or more graphical representations of the first entry and second entry, the one or more graphical representations indicating a storage location of the first document, a storage location of the second document, and whether at least one relationship exists between the first document and the second document based on the comparison of the first entry and the second entry, the one or more generated graphical representations including at least one of a duplicate indicator or version indicator.

2. The system of claim 1, wherein the at least one processor compares a content of the first document to a content of the second document.

3. The system of claim 1, wherein the at least one processor compares a metadata of the first document to a metadata of the second document.

4. The system of claim 1, wherein the at least one processor is further configured to synchronize the first document and the second document.

5. The system of claim 4, wherein the at least one processor is further configured to delete the first document or the second document after synchronization.

6. The system of claim 1, wherein the at least one processor is further configured to:
   receive information for a first plurality of documents managed by the first networked document repository;
   receive information for a second plurality of documents managed by the second document repository;
   determine a number of duplicate documents and a number of unique documents among the first plurality of documents and the second plurality of documents; and
   provide, in the user interface, at least one of the number of unique documents or the number of duplicate documents.

7. The system of claim 1, wherein the first networked document repository is associated with a first cloud storage server or a network attached storage.

8. The system of claim 7, wherein the second document repository is associated with a local drive, a network drive, or a second cloud storage server.

9. The system of claim 1, wherein the graphical representations comprise links that provide access to a selected document of the plurality of documents.

10. The system of claim 1, wherein the at least one processor is configured to access the first and second document repositories comprises sending a request for access to the first and second document repositories, and receiving at least one access token from the first document repository or the second document repository.

11. A method for managing document repositories, comprising:
   accessing, by at least one processor, a first networked document repository, the first networked document repository being remote to the at least one processor and accessed via a network;
   receiving, by the at least one processor, first information associated with a first document managed by the first networked document repository;
   generating, by the at least one processor, a first entry in a database including the received first information;
   accessing, by the at least one processor, a second document repository different from the first networked document repository;
   receiving, by the at least one processor, second information associated with a second document managed by the second document repository;
   generating, by the at least one processor, a second entry in the database including the received second information;
   comparing, by the at least one processor, the first entry and the second entry, by:
      analyzing the first information included in the first entry and the second information included in the second entry, and determining, based on predefined criteria for at least one of duplicates or versions, whether the first document and the second document are related as duplicates or versions;

responsive to a determination that the first document and the second document are related as duplicates, generating data for automatically updating the duplicates when a duplicate is modified, thereby linking the duplicates;

responsive to a determination that the first document and the second document are related as versions, generating metadata identifying the versions and corresponding storage locations, thereby linking the versions; and generating, by the at least one processor, a user interface including one or more graphical representations of the first entry and second entry, the one or more graphical representations indicating a location of the first document, a storage location of the second document, and whether at least one relationship exists between the first document and the second document based on the comparison of the first entry and the second entry, the one or more generated graphical representations including at least one of a duplicate indicator or version indicator.

12. The method of claim 11, wherein the at least one processor compares a content of the first document to a content of the second document.

13. The method of claim 11, wherein the at least one processor compares a metadata of the first document to a metadata of the second document.

14. The method of claim 11, wherein the at least one processor synchronizes the first document and the second document.

15. The method of claim 14, wherein the at least one processor deletes the first document or the second document after synchronization.

16. The method of claim 11, further comprising:
receiving, by the at least one processor, information for a first plurality of documents managed by the first networked document repository;
receiving, by the at least one processor, information for a second plurality of documents managed by the second document repository;
determining, by the at least one processor, a number of duplicate documents and a number of unique documents among the first plurality of documents and the second plurality of documents; and
providing in the user interface, by the at least one processor, at least one of the number of unique documents or the number of duplicate documents.

17. The method of claim 11, wherein the first networked document repository is associated with a first cloud storage server or a network attached storage.

18. The method of claim 17, wherein the second document repository is associated with a local drive, a network drive, or a second cloud storage server.

19. The method of claim 11, wherein the graphical representations comprise links that provide access to a selected document of the plurality of documents.

20. The method of claim 11, wherein accessing the first and second document repositories comprises sending a request for access to the first and second document repositories, and receiving at least one access token from the first document repository or the second document repository.

21. A non-transitory computer readable medium storing instructions that when executed cause at least one processor to perform a method of managing document repositories, comprising:
accessing a first networked document repository, the first networked document repository being remote to the at least one processor and accessed via a network;
receiving information for a first plurality of documents managed by the first networked document repository;
accessing a second document repository different from the first networked document repository;
receiving information for a second plurality of documents managed by the second document repository;
comparing the received information for the first plurality of documents and the second plurality of documents, by:
analyzing the first information included in the first entry and the second information included in the second entry, and
determining, based on predefined criteria for at least one of duplicates, whether the first document and the second document are related as duplicates;
determining a number of duplicate documents and a number of unique documents among the first plurality of documents and the second plurality of documents;
generating data for automatically updating the duplicate documents when a duplicate is modified, thereby linking the duplicates;
generating, in a memory, at least one entry for the first plurality of documents and the second plurality of documents, the at least one entry including the number of duplicate documents or the number of unique documents; and
generating a user interface including one or more graphical representations of the at least one entry, the one or more graphical representations indicating a storage location of at least one of the first plurality of documents, a storage location of at least one of the second plurality of documents, and the number of duplicate documents or the number of unique documents, the one or more generated graphical representations including a duplicate indicator.

22. A system for managing document repositories, comprising:
a network;
a memory storing instructions; and
at least one processor in communication with the network and the memory, the at least one processor configured to execute the stored instructions to:
access a first networked document repository;
receive first information associated with a first document managed by the first networked document repository;
generate a first entry in a database including the received first information;
access a second document repository different from the first document repository, wherein at least one of the first document repository and the second document repository is remote to the at least one processor and accessed via the network;
receive second information associated with a second document managed by the second document repository;
generate a second entry in the database including the received second information;

analyze the first information included in the first entry and the second information included in the second entry;

determine, based on predefined criteria for at least one of duplicates or versions, whether the first document and the second document are related as duplicates or versions;

responsive to a determination that the first document and the second document are related as duplicates, generating data for automatically updating the duplicates when a duplicate is modified, thereby linking the duplicates;

responsive to a determination that the first document and the second document are related as versions, generating metadata identifying the versions and corresponding storage locations, thereby linking the versions;

receive an instruction to sync the first document and the second document;

modify the first entry and/or the second entry to indicate that the first document and the second document are synced; and generate a user interface including one or more graphical representations of the first entry and second entry, the one or more graphical representations indicating that the first document and the second document are synced, the one or more generated graphical representations including at least one of a duplicate indicator or version indicator.

23. The system of claim 22, wherein the one or more graphical representations indicate a storage location of the first document and a storage location of the second document.

* * * * *